(12) United States Patent
Schaper et al.

(10) Patent No.: US 11,852,120 B2
(45) Date of Patent: Dec. 26, 2023

(54) METHOD OF ADJUSTING AT LEAST ONE ROTOR BLADE OF A WIND TURBINE AND A SYSTEM AND A WIND TURBINE FOR CARRYING OUT THE METHOD

(71) Applicant: Wobben Properties GmbH, Aurich (DE)

(72) Inventors: Ulf Schaper, Staffhorst (DE); Lukas Wernicke, Kiel (DE); Kai-Uwe Wegner, Wittmund (DE)

(73) Assignee: Wobben Properties GmbH, Aurich (DE)

( * ) Notice: Subject to any disclaimer, the term of this patent is extended or adjusted under 35 U.S.C. 154(b) by 30 days.

(21) Appl. No.: 17/544,468

(22) Filed: Dec. 7, 2021

(65) Prior Publication Data

US 2022/0178348 A1   Jun. 9, 2022

(30) Foreign Application Priority Data

Dec. 8, 2020  (EP) .................................... 20212514

(51) Int. Cl.
*F03D 7/02*   (2006.01)
(52) U.S. Cl.
CPC ...... *F03D 7/0276* (2013.01); *F05B 2220/706* (2013.01); *F05B 2270/32* (2013.01); *F05B 2270/327* (2013.01); *F05B 2270/328* (2013.01); *F05B 2270/808* (2013.01); *F05B 2270/8041* (2013.01)
(58) Field of Classification Search
CPC ................. F03D 7/0276; F03D 7/0224; F05B 2220/706; F05B 2270/32; F05B 2270/327; F05B 2270/328; F05B 2270/8041; F05B 2270/808; F05B 2260/76; F05B 2270/332; Y02E 10/72
See application file for complete search history.

(56) References Cited

U.S. PATENT DOCUMENTS

| 7,905,704 B2 | 3/2011 | Harms et al. | |
| 9,309,866 B2 | 4/2016 | Warfen et al. | |
| 2011/0221194 A1* | 9/2011 | Egedal | F03D 7/0224 |
| | | | 290/44 |
| 2013/0119663 A1* | 5/2013 | Birk | F03D 7/0284 |
| | | | 290/44 |
| 2016/0305402 A1* | 10/2016 | Caponetti | F03D 7/0224 |
| 2020/0072192 A1 | 3/2020 | Meli Tiwa et al. | |

FOREIGN PATENT DOCUMENTS

| DE | 102006051352 A1 | | 4/2008 |
| DE | 102008012956 A1 | | 9/2009 |
| DE | 102016125045 A1 | | 6/2018 |
| IN | 201821038752 A | * | 4/2020 |
| KR | 1020170009263 | * | 1/2017 |
| WO | 2015/014366 A1 | | 2/2015 |

* cited by examiner

*Primary Examiner* — Woody A Lee, Jr.
*Assistant Examiner* — Eric A Lange
(74) *Attorney, Agent, or Firm* — Seed IP Law Group LLP

(57) ABSTRACT

A method of adjusting at least one rotor blade of a wind turbine which includes the steps of receiving a command for adjustment of the rotor blade at an adjustment speed, ascertaining a current moment of inertia of the rotor blade and acceleration of the rotor blade until reaching the adjustment speed, wherein the acceleration until reaching the adjustment speed is limited in dependence on the ascertained moment of inertia. A system and a wind turbine.

19 Claims, 3 Drawing Sheets

METHOD OF ADJUSTING AT LEAST ONE ROTOR BLADE OF A WIND TURBINE AND A SYSTEM AND A WIND TURBINE FOR CARRYING OUT THE METHOD

BACKGROUND

Technical Field

The invention concerns a method of adjusting a rotor blade of a wind turbine and a system and a wind turbine adapted to carry out the method.

Description of the Related Art

Wind turbines are known from the state of the art in which the rotor blades are fixedly connected to a hub in order thus to form a rotor of the wind turbine. In modern wind turbines in comparison however it is now in the meantime common for the rotor blades to be rotatable about their longitudinal axis and thus allow adjustment thereof. That adjusts a blade attack angle which can also be referred to as the pitch angle. Adjustment of the rotor blades about their longitudinal axis is also referred to as pitching of the rotor blades.

The efficiency of a wind turbine is optimized by pitching as a power output of the wind turbine can be adapted to changing wind speeds. In that way a wind turbine can be operated at a constant rated power output over a predefined wind speed range. It is only above a rated speed that the rotor blades, therefore the pitch angles thereof, are then further adjusted in order to limit the power output and the loading on the wind turbine. In particular at very high wind speeds the rotor blades are rotated completely into a feathered position whereby the blade lift breaks down and the rotor comes substantially to a stop. That avoids damage.

Particularly in the case of abruptly changing wind speeds therefore high displacement speeds are necessary for changing the blade attack angle, that is to say the pitch angle, in order to avert a rising load on the wind turbine as quickly as possible. With those high displacement speeds and in particular when accelerating the rotor blade to reach those displacement speeds a very high level of power is consumed by the adjusting drives which are also called pitch drives.

As the adjusting drives have a comparatively high power consumption components of the power supply of a wind turbine for operation have to be substantially designed in such a way that they can deliver sufficient power for desired adjusting operations. Limits are imposed on that design configuration of the power supply however as in terms of dimensioning it is admittedly necessary to be able to counteract extreme load situations by a fast reaction but the costs for corresponding dimensioning are not to call into question the commercial viability of the wind turbine.

BRIEF SUMMARY

Provided are one or more techniques for ensuring adjustment of rotor blades as rapidly as possible, in particular in extreme load situations, with an economically viable power supply device.

Accordingly there is proposed a method of adjusting at least one rotor blade of a wind turbine. According to the method firstly a command for adjustment of the rotor blade at an adjustment speed is obtained or received. Adjustment of the rotor blade concerns adjustment of the attack angle which is also referred to as the pitch angle of the rotor blade. Accordingly adjustment of the rotor blade involves rotation of the rotor blade about its longitudinal axis. In that respect the adjustment speed corresponds to an angular speed which can also be referred to as a rotational speed or rotary speed.

The command for adjustment of a rotor blade is created for example in a control means or a module of a control means of a wind turbine, namely a wind turbine control and based on an event like for example a change in the wind speed or wind direction which acts on the rotor blade. A further module of the control or a further control means, for example a pitch control, of the wind turbine then preferably receives that command.

In a next step a current moment of inertia of the rotor blade is ascertained. The ascertained moment of inertia denotes the moment of inertia which is expected upon a change in the pitch angle of the rotor blade from the current position, that is to say the current pitch angle. In addition the rotor blade is accelerated until reaching the adjustment speed. In that respect the adjustment is limited in dependence on the ascertained moment of inertia.

Accordingly preferably an acceleration threshold value is ascertained from the current moment of inertia and the acceleration is increased as long as it is below the acceleration threshold.

Accordingly therefore in acceleration of the rotor blade the moment of inertia thereof is taken into consideration. In that respect the disclosure is based on the realization that, for adjustment, that is to say pitching, of a rotor blade out of a rest position up to an adjustment speed, more power is required for the acceleration, the correspondingly higher the current moment of inertia is. In addition the disclosure is based on the realization that the moment of inertia of a rotor blade of a wind turbine varies in dependence on various conditions and is not constant. That is utilized by a limit on an acceleration being varied in dependence on a previously recognized current moment of inertia which is crucial for a power consumption of an adjusting drive in an acceleration situation.

Therefore, starting from a maximum available power output for adjustment of the rotor blade, taking into account the current moment of inertia, it is possible to select the greatest possible acceleration. That ensures that, particularly in the case of extreme loads, by virtue of a maximum possible level of acceleration, without overloading a given design configuration of a power supply, it is possible rapidly to reach a secure state of the wind turbine. In that respect it is accepted that situations can occasionally occur in which a higher loading on the wind turbine briefly occurs. That is the case when only a comparatively slow acceleration is possible by virtue of a high level of moment of inertia so that wind forces can act for longer on the wind turbine. In return however oversizing of a power supply or the components for the power supply can be avoided.

According to a first embodiment a current deflection of the rotor blade is ascertained and the current moment of inertia is determined in dependence on the ascertained current deflection of the rotor blade. In that respect the situation is based on the realization that a moment of inertia of a rotor blade is dependent substantially on its deflection. The deflection can also be referred to as flexing or warpage of the rotor blade and describes for example a displacement of the rotor blade tip in the currently prevailing state with respect to a rest state in which preferably no wind force is acting on the rotor blade. In the case of a severely deflected rotor blade accordingly forces act for example in the connecting region of the rotor blade to the rotor hub, that influence the moment of inertia. The greatest proportion of a moment of inertia of the rotor blade substantially results from those forces, in particular in comparison with other proportions which are negligible, so that it is solely by ascertaining the deflection of the rotor blade that it is possible to sufficiently accurately arrive at a current moment of inertia. Moreover deflection of a rotor blade can be comparatively accurately determined.

According to a further embodiment a current wind speed is ascertained, preferably in the region of the rotor blade or the wind turbine on which the rotor blade is arranged. The deflection or moment of inertia of the rotor blade is ascertained in dependence on the ascertained wind speed. That involves making use of the realization that a deflection of the rotor blade is substantially dependent on the current wind speed. Particularly if in addition a current blade angle of attack and for example a current speed of rotation of the rotor on which the rotor blade is arranged are known. In particular having regard to the wind speed and preferably having regard to the rotary speed of the rotor and/or the current angle of attack of the rotor blade it is thus possible to determine the deflection without direct measurement of the deflection. It is thus possible to dispense with additional hardware for determining the deflection.

According to a further embodiment the current wind speed is ascertained by the current wind speed being measured, in particular with an anemometer or a lidar system which is also referred to as a wind lidar. Alternatively a continuously determined wind speed mean value is retrieved and used as the current wind speed for determining the deflection. The continuously determined wind speed mean value is for example a 3-second mean value or a 10-second mean value. 3-second mean values or 10-second mean values are present in any case for different open-loop or closed-loop control functions by virtue of the continuous determination thereof in a control means of a wind turbine and can be directly retrieved. When reference is made here and hereinafter to a control means then the control means is not limited to the open-loop control functions but depending on the respective requirement serves for open-loop control and closed-loop control.

According to a further embodiment the current moment of inertia or the current deflection is ascertained in dependence on the angle of attack of the rotor blade and/or a rotary speed of the rotor to which the rotor blade belongs and/or a current electrical power which is generated with the wind turbine generator with which the rotor blade is associated, to determine the moment of inertia or the deflection. Even without consideration of a wind speed it is possible to arrive indirectly at a current wind speed, and thus in turn the moment of inertia and accordingly a limitation on acceleration, by determining the pitch angle, the rotary speed and the current power output.

According to a further embodiment the current deflection of the rotor blade is ascertained with sensors, in particular strain gauges or an optical sensor system on the rotor blade. In comparison with determination or exclusively indirect determination of the deflection and thus the moment of inertia there are accordingly provided sensors to measure deflection of the rotor blade directly. Preferably those sensors are strain gauges or correspond to an optical sensor system. One or more strain gauges can be easily fixed to or in the rotor blade and directly provide information about flexing or warping of the rotor blade in order thus also to determine the deflection in that way.

An optical sensor system which is in the form of a laser sensor includes for example a laser which is arranged at a longitudinal end of the rotor blade, for example the rotor blade hub, and the light of which is passed by way of mirrors along the longitudinal axis of the rotor blade to a detector at the same or the opposite end at which the laser itself is also arranged. Displacement of the beam by movement of the mirrors results in a detectable change in the point of impingement of the laser on the sensor so that in that way it is possible to arrive at a conclusion about flexing of the rotor blade and thus corresponding deflection. Deflection of the rotor blade can be particularly accurately determined in that way so that ultimately the current moment of inertia can also be determined with a high degree of accuracy.

Furthermore the optical sensor system can preferably also be a camera system in which a light is emitted along the longitudinal axis of the rotor blade through the rotor blade from a light source, for example an infrared light source. Reflectors in the rotor blade reflect the light, the reflected light being recorded by a camera. The reflectors are fixedly arranged at various positions in the rotor blade so that a blade deflection leads to relative displacements of the reflectors relative to each other, which can be determined by the camera.

According to a further embodiment the command for adjustment includes at least one command for adjustment of at least two rotor blades. Accordingly the command requires that two rotor blades are adjusted at the adjustment speed contained in the command. According to the embodiment a first rotor blade of two rotor blades of a rotor is accelerated and after the expiry of a predetermined period of time or after the occurrence of a predefined event a second rotor blade of the two rotor blades is accelerated. The predetermined period of time is preferably less than 250 milliseconds or less than 100 milliseconds and particularly preferably more than 50 milliseconds. A defined event is for example the attainment of the adjustment speed of the first rotor blade or the attainment of a predetermined acceleration of the first rotor blade.

This embodiment is based on the realization that it is precisely at the beginning of an acceleration for changing the angle of attack of the rotor blade from a rest position that a particularly high level of power is consumed by the motors used for the adjustment. Offset or cascaded initiation of the movement of the rotor blades, even with only a very slight time shift, accordingly avoids high power peaks of a total power output for the adjustment of a plurality of rotor blades. A comparatively higher level of acceleration of an individual rotor blade is thus possible.

According to a further embodiment the command for adjustment includes a command for the adjustment of at least two rotor blades. Accordingly a current first moment of inertia for a first rotor blade of two rotor blades and a current second moment of inertia for a second rotor blade of the two rotor blades is ascertained. The acceleration of the first rotor blade is limited until reaching the adjustment speed in dependence on the ascertained first moment of inertia and the acceleration of the second rotor blade is limited until attaining the adjustment speed in dependence on the ascertained second moment of inertia. In that respect account is taken of the fact that moments of inertia, besides the above-mentioned deflection or warpage, are also dependent on other factors. That is for example an orientation of the rotor blade longitudinal axis relative to a reference plane of the wind turbine, for example a vertical or horizontal line. A rotor blade for example at a "6 o'clock position" involves a different moment of inertia from being at a "9 o'clock position." That is taken into consideration here by moments of inertia being respectively determined individually for a plurality of rotor blades and the accelerations of the respective rotor blades being limited individually in dependence on their respective individual moment of inertia. That makes it possible for a rotor blade which for example involves a lower moment of inertia in comparison with another rotor blade to also be accelerated correspondingly faster. Loads, in particular extreme loads, on the wind turbine overall can thus be averted even more quickly even if only one of the rotor blades is accelerated comparatively more quickly than one or more of the other rotor blades.

According to a further embodiment an association which associates a moment of inertia with a current deflection of the rotor blade or a state of the wind turbine is stored. The association is preferably in the form of a table or diagram in a control means, in particular a control means for adjustment of the rotor blade. The association is previously ascertained preferably by means of a simulation or by test series and then stored in a memory of the control means. A deflection which is measured either indirectly, for example by way of the wind speed, or directly, for example by sensors, can thus be easily converted into a resulting moment of inertia. Preferably a plurality of values of the moment of inertia are provided for each deflection in order in that way to replicate different moments of inertia in tests or simulations in dependence on further operating parameters. In that case by virtue of the association it is possible to easily ascertain an average value or a maximum or minimum value, derived from the simulation, of a moment of inertia, preferably even when involving an offset or the like.

According to a further embodiment a maximum acceleration value is established. The acceleration is limited in dependence on the ascertained moment of inertia by the maximum acceleration value. Accordingly the acceleration does not exceed the predetermined maximum acceleration value, even if that were possible by virtue of the ascertained moment of inertia. Accordingly it is possible to avoid levels of acceleration which by virtue of prevailing, comparatively low moments of inertia, would lead to adjustment of the rotor blades with an acceleration which could damage the rotor blade or adjustment components like for example an adjustment drive.

According to a further embodiment the command for adjustment includes a command for adjustment of precisely three rotor blades of a wind turbine. The limitation on acceleration for each of the rotor blades is the same and is the result of a calculation. A threshold value is therefore ascertained with the calculation. The calculation includes a division in which a product from presetting of a predefined maximum power and a level of efficiency is divided by the total of the ascertained moments of inertia for all three rotor blades. Simple calculation of the limitation on the acceleration is thus possible on the basis of known parameters.

According to a further embodiment prior to the command for adjustment of at least one rotor blade being received an extreme load avoidance function is activated. This means that the method is carried out in particular when an extreme load avoidance function is performed. That extreme load avoidance function can be for example a function which is carried out by the wind turbine in the event of suddenly occurring and recognized squalls or severe wind gusts. An extreme load avoidance function serves to counteract an overload or at least an excessively severe loading on the wind turbine which leads to damage or at least to a comparatively high stressing which in turn leads to comparatively severe wear.

It is precisely in the cases of a triggered extreme load avoidance function that a high displacement speed and in conjunction therewith a high level of acceleration of the rotor blades is necessary and therefore has to be ensured in particular in such cases that an existing power supply is not overloaded.

Furthermore provided is a system adapted to carry out the method according to one of the above-mentioned embodiments. In addition provided is a wind turbine comprising the system, at least one rotor blade and a control means which is adapted to carry out the method according to one of the above-mentioned embodiments. The wind turbine further includes a power supply for supplying at least one adjustment drive of the rotor blade. The control means is adapted to determine the acceleration in such a way that a maximum power which is predefined or which can be provided by the power supply is not exceeded.

BRIEF DESCRIPTION OF THE SEVERAL VIEWS OF THE DRAWINGS

Further configurations will be apparent from the embodiments by way of example described in greater detail with reference to the Figures in which.

DETAILED DESCRIPTION

Figure 1:
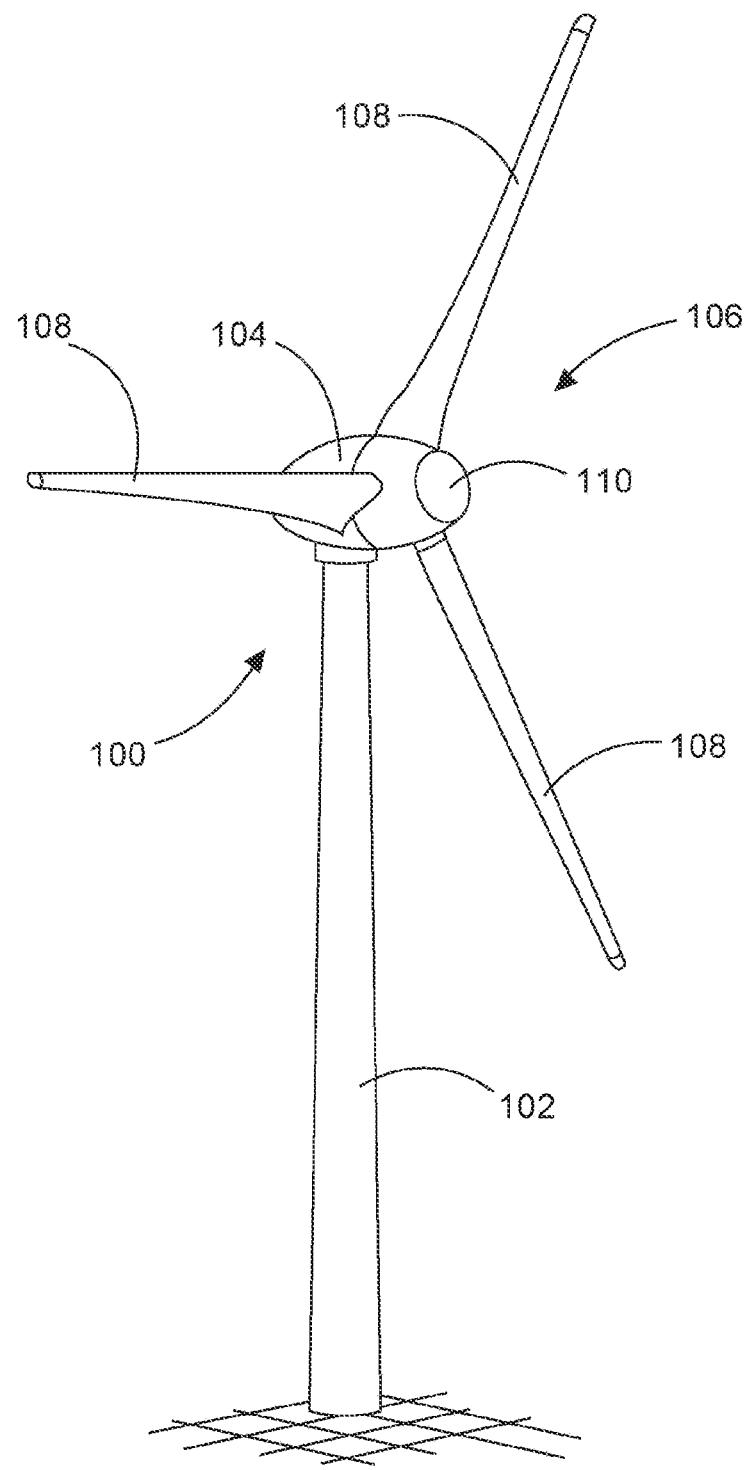
FIG. 1 shows a wind turbine.

FIG. 1 shows a diagrammatic view of a wind turbine according to the invention. The wind turbine 100 has a tower 102 and a nacelle 104 on the tower 102. Provided on the nacelle 104 is an aerodynamic rotor 106 having three rotor blades 108 and a spinner 110 which can also be referred to as the rotor blade hub. In operation of the wind turbine 100 the aerodynamic rotor 106 is caused to rotate by the wind and thus also rotates an electrodynamic rotor or rotor member of a wind turbine generator coupled directly or indirectly to the aerodynamic rotor 106. The electric wind turbine generator is arranged in the nacelle 104 and generates electrical power. The pitch angles of the rotor blades 108, which can also be referred to as rotor blade attack angles or briefly angles of attack can be altered by pitch motors which can also be referred to as adjustment drives at the rotor blade roots of the respective rotor blades 108.

Figure 2:
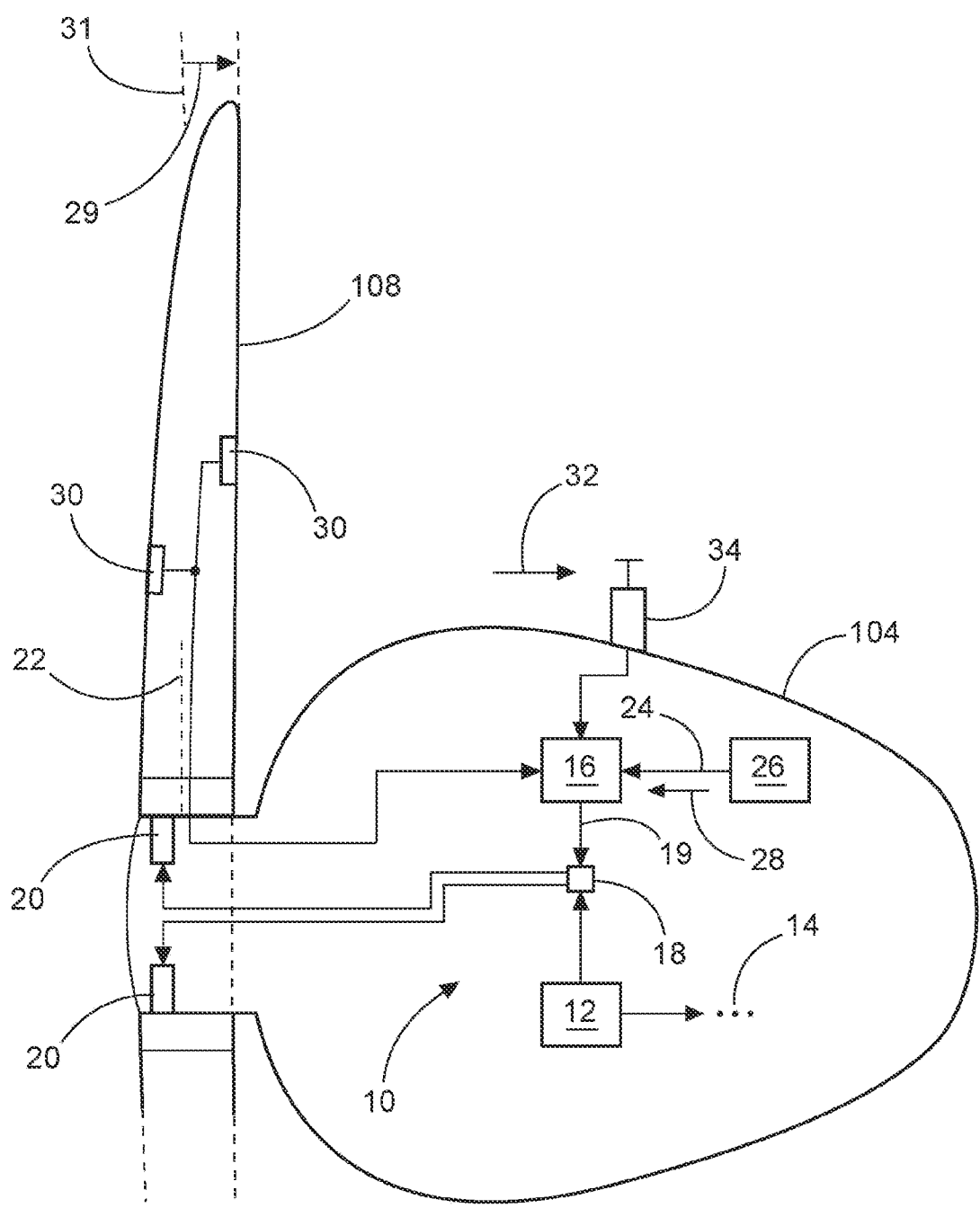
FIG. 2 shows a system for adjustment of the rotor blades.

FIG. 2 shows a diagrammatic view of a nacelle 104 of a wind turbine with individual components of a system 10 according to an embodiment in order to carry out an embodiment of the method of adjusting at least one rotor blade 108 of a wind turbine 100.

Arranged in the nacelle 104 is a power supply 12 which supplies power to further components 14 (not shown) of the wind turbine. A controller 16 for adjustment of the rotor blades is also shown. The controller 16 can also be referred to as a pitch controller. The controller 16 is connected to a power electronic system 18 to which power is fed by the power supply. By actuation of the power electronic system 18 with an actuation signal 19 one or more adjusting drives 20 are supplied with power corresponding to the actuation signal 19 in order to rotate the rotor blades 108 which are also shown in FIG. 2 about a longitudinal axis 22, that is to say to adjust the pitch angles thereof. In dependence on the actuation signal 19, for example when a low level of acceleration or adjustment speed, that is to say a speed of rotation, of the rotor blade 108 is desired the power circuit 18 is actuated in such a way that only a comparatively low amount of power is passed to the motors 20 from the power supply 12. In a situation involving high desired levels of acceleration or adjustment speeds the power electronic system 18 is in comparison actuated in such a way that comparatively more power is fed to the motors 20 from the power supply 12.

For that purpose the controller 16 for control of the pitch motors 20 receives a command 24 for adjustment of the rotor blades 108 from a wind turbine control system 26. The wind turbine control system 26 is connected to a large number of further components 14 in order to set, provide for closed-loop control of and monitor operating states of the components 14 with the wind turbine control system 26. Monitoring also includes monitoring the operating state itself and also environmental influences acting on the wind turbine 100.

If in dependence on a current operating state and for example changing environmental influences like for example the occurrence of severe squalls, an extreme load is detected, namely a loading on the wind turbine reaches an avoidable degree of wear or even a threat of damage then for example a command 24 is sent to the controller 16 for adjustment of the rotor blades 108. In that case preferably also a desired adjustment speed 28 is preset with the command 24, which is selected to be comparatively high in relation to an adjustment speed 28 which is wanted in normal operation of the wind turbine 100, for example to avoid damage or a high level of wear. Then a current moment of inertia of the rotor blade 108 or all rotor blades 108 is ascertained in the controller 16 for actuation of the pitch motors 20. As the rotor blade 108 is substantially dependent on a deflection 29 from a rest position 31 which can also be referred to as warpage of the rotor blade 108, strain gauges 30 are provided in the rotor blade 108, with which warpage and thus a deflection 29 of the rotor blade 108 can be directly detected. Therefore the controller 16 ascertains a current moment of inertia of the rotor blade 108 on the basis of the deflection 29 measured with the strain gauges 30.

Alternatively or additionally it is also possible to measure a wind speed 32 which prevails in the region of an anemometer and that can be taken into consideration as the current wind speed 33 in determining the moment of inertia. The controller 16 then controls the power electronic system 18 in dependence on the ascertained moment of inertia and the adjustment speed in such a way that the rotor blade 108 is accelerated until reaching the adjustment speed, in which respect the level of acceleration remains below a threshold value of an acceleration which was determined in dependence on the moment of inertia. The acceleration is thus limited in dependence on the ascertained moment of inertia. That ensures that the power supply 12 can provide sufficient power for powering the components 14, even if power has to be delivered for acceleration of the pitch motors 20, as the power for the pitch motors 20 is suitably limited.

Figure 3:
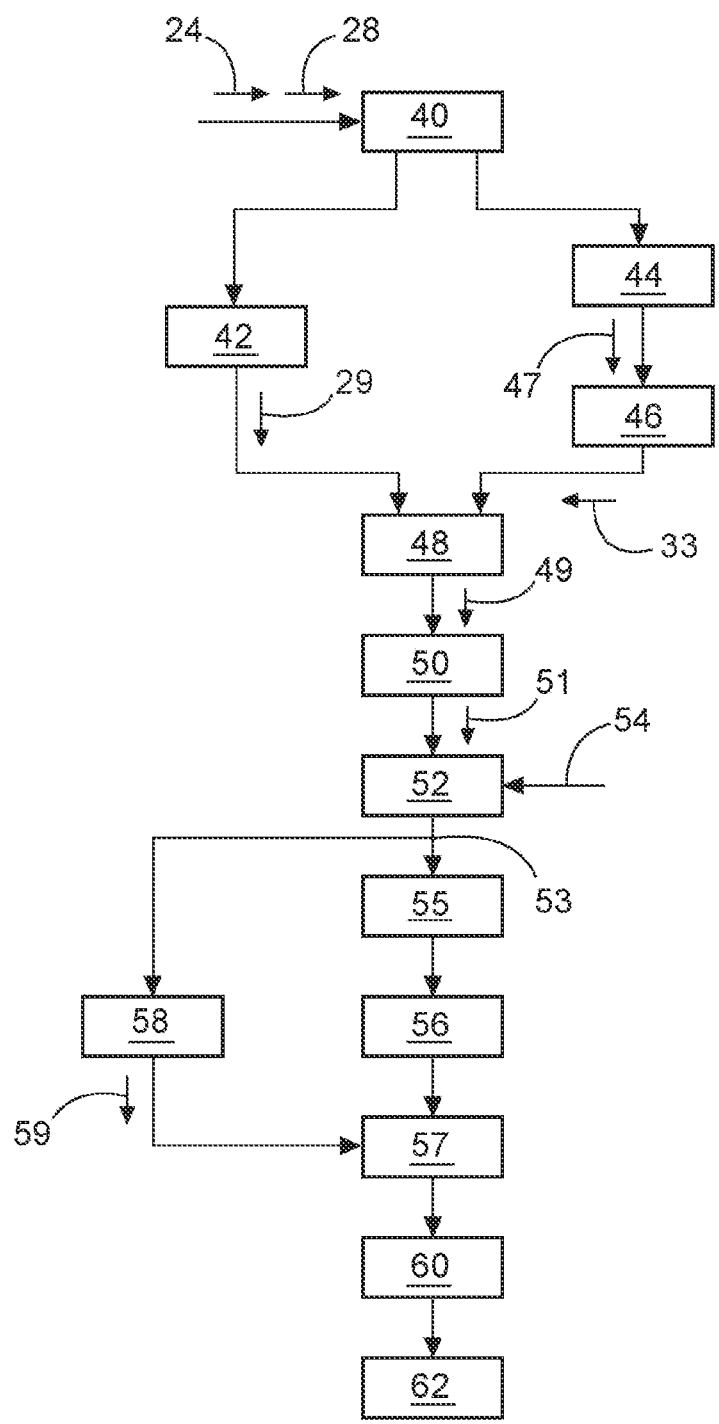
FIG. 3 shows the steps in an embodiment of the method.

FIG. 3 shows the steps in the method according to an embodiment for adjusting at least one rotor blade of a wind turbine. In a step 40 a command for adjustment of the rotor blade 108 at an adjustment speed 28 is received. Thereupon warpage or deflection 29 of the rotor blade 108 is determined in a step 42. Alternatively in step 46 a current wind speed 33 is determined in the region of the wind turbine 100 or the rotor blade 108. That can be effected as in FIG. 2 by direct recording of the wind speed 33 from an anemometer 34, in which case in the present embodiment a 10-second mean value 47 stored in a wind turbine control system 26 is retrieved in step 44.

Furthermore in a step 48 in both alternatives of different preceding steps a rotary speed 49 of the rotor 106 of the wind turbine 100 is determined in the step 48 while in a step 50 in addition the pitch angle 51 of at least one of the rotor blades 108 is also determined. Thereupon the moment of inertia 53 of the rotor blade or blades 108 is determined in a step 52 from all the detected values, namely either the deflection 29, the rotary speed 49 of the rotor 106 and the pitch angle 51 or the wind speed 33, the rotary speed 49 and the rotor blade angle 51. Preferably that involves using an association 54, on the basis of which the moment of inertia 53 is afforded from the previously ascertained values. Then in a step 55 the power electronic system 18 is so actuated that in step 56 the rotor blade or blades 108 is or are accelerated until reaching the adjustment speed with the pitch motors 20. In step 57 directly after the beginning of acceleration, a check is made to ascertain that the power electronic system 18 is actuated in such a way that acceleration until reaching the adjustment speed 28 is limited in dependence on the ascertained moment of inertia 53. For that purpose a threshold value 59 is preferably determined in parallel from the moment of inertia 53 in a step 58, in which respect the threshold value 59 may not be exceeded by the acceleration.

Then in step 60 the predetermined adjustment speed 28 is reached so that an acceleration is reduced to 0 and the rotor blade 108 is adjusted until reaching a position which is also preset with the command, namely a target pitch angle.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of adjusting a rotor blade of a wind turbine, the method comprising:
   receiving a command for adjusting the rotor blade to an adjustment speed,
   determining a current moment of inertia of the rotor blade,
   accelerating the rotor blade until reaching the adjustment speed, wherein the accelerating is limited in dependence on the current moment of inertia, and
   determining a current deflection of the rotor blade, and wherein determining the current moment of inertia comprises determining the current moment of inertia in dependence on the determined current deflection of the rotor blade.

2. The method as claimed in claim 1 comprising determining a current wind speed, and wherein the current deflection and/or the current moment of inertia of the rotor blade is determined in dependence on the determined current wind speed.

3. The method as claimed in claim 2 wherein the current wind speed is determined by a measured wind speed or by a continuously determined wind speed mean value.

4. The method as claimed in claim 3 wherein the measured wind speed is measured by an anemometer or a lidar system.

5. The method as claimed in claim 3 wherein the continuously determined wind speed mean value is a 3-second mean value or a 10-second mean value that is retrieved.

6. The method as claimed in claim 1 wherein the current moment of inertia or the current deflection is determined in dependence on a current pitch angle of the rotor blade and/or a current rotary speed of a rotor coupled to the rotor blade and/or a current electrical power of a wind turbine generator of the wind turbine.

7. The method as claimed in claim 1 wherein determining the current deflection of the rotor blade is performed by one or more sensors.

8. The method as claimed in claim 7 wherein the one or more sensors include at least one of a strain gauge, an optical sensor, a laser sensor, or a camera on the rotor blade.

9. The method as claimed in claim 1 wherein receiving the command for adjusting the rotor blade comprises receiving a command for adjusting first and second rotor blades, wherein adjusting the first rotor blade comprises accelerating the first rotor blade and after an expiration of a predetermined period of time or after the occurrence of a predefined event, accelerating the second rotor blade.

10. The method as claimed in claim 9 wherein the predetermined period of time is less than 250 milliseconds.

11. The method as claimed in claim 9 wherein the predetermined period of time is less than 100 milliseconds.

12. The method as claimed in claim 1 wherein receiving the command for adjusting the rotor blade comprises receiving a command for adjusting first and second rotor blades, and further comprising:
- determining a current first moment of inertia for the first rotor blade and a current second moment of inertia for the second rotor blade, and
- the acceleration of the first rotor blade until reaching the adjustment speed is limited in dependence on the ascertained first moment of inertia and the acceleration of the second rotor blade until reaching the adjusting speed is limited in dependence on the ascertained second moment of inertia.

13. The method as claimed in claim 1 wherein to determine the moment of inertia an association is stored, wherein in the association at least one moment of inertia is associated with each deflection or each of a plurality of states of the wind turbine, wherein the association is previously determined by a simulation or by test series and is stored in a memory.

14. The method as claimed in claim 1 further comprising establishing a maximum acceleration value, and wherein the acceleration of the rotor blade is effected in such a way that the maximum acceleration value is not exceeded independently of the determined moment of inertia.

15. The method as claimed in claim 1 wherein receiving the command comprises receiving the command for adjusting three rotor blades of a wind turbine, and wherein a threshold value for limitation of the accelerations for each of the rotor blades is respectively identical as a result of division of a mathematical product from a presetting of a predefined maximum power and a level of efficiency of the pitch motors used for the adjustment by a total of the determined moments of inertia for all three rotor blades.

16. The method as claimed in claim 1 comprising activating an extreme load avoidance function by a wind turbine controller prior to receiving the command for adjusting the rotor blade.

17. A system adapted to carry out the method as claimed in claim 1.

18. A wind turbine comprising:
- a system configured to:
  - receive a command for adjusting a rotor blade to an adjustment speed,
  - determine a current moment of inertia of the rotor blade, and
  - accelerate the rotor blade until the adjustment speed is reached, wherein the accelerating is limited in dependence on the current moment of inertia, and
  - determine a current deflection of the rotor blade, and wherein the current moment of inertia is determined in dependence on the determined current deflection of the rotor blade,
- a power supply,
- a rotor blade,
- a pitch drive coupled to the rotor blade, and
- a controller, wherein the power supply is configured to supply the pitch drive of the rotor blade, and wherein the controller is configured to determine acceleration of the rotor blade in such a way that a maximum power is not exceeded.

19. The wind turbine as claimed in claim 18, wherein the maximum power is predefined or is provided by the power supply.

* * * * *